United States Patent Office 3,377,346
Patented Apr. 9, 1968

3,377,346
NOVEL PARASITICIDES AND THEIR PRODUCTION
Jean-Pierre Leber and Karl Lutz, Basel, Switzerland, assignors to Sandoz Ltd. (also known as Sandoz A.G.), Basel, Switzerland
No Drawing. Filed June 8, 1964, Ser. No. 373,570
Claims priority, application Switzerland, June 12, 1963, 7,312/63
3 Claims. (Cl. 260—246)

ABSTRACT OF THE DISCLOSURE

Compounds of the formula $$[(R_1)_2N]_2-\underset{\underset{X}{\|}}{P}-S-\underset{\underset{S}{\|}}{C}-N(R_2)_2$$

wherein $R_1$ is either lower alkyl or lower alkyl substituted with at least one chloro, hydroxy, cyano and/or nitro substituent;
$R_2$ is either monocyclic aryl or a substituted or unsubstituted lower alkyl as defined for $R_1$;
X is either oxygen or sulfur; and
$(R_1)_2N-$ and/or $(R_2)_2N-$ may be a heterocyclic ring containing the nitrogen atom have parasiticidal properties.

---

The present invention provides novel organic phosphorus containing compounds having parasiticidal properties and a process for their production.

The present invention provides compounds of Formula I $$[(R_1)_2N]_2\underset{\underset{X}{\|}}{P}-S-\underset{\underset{S}{\|}}{C}-N(R_2)_2 \quad \text{I}$$

in which $R_1$ is selected from lower alkyl radicals and said radicals substituted with at least one of Cl—, HO—, NC— and $O_2N$—,
$R_2$ is selected from monocyclic aryl radicals, lower alkyl radicals and said alkyl radicals substituted with at least one of Cl—, HO—, NC— and $O_2N$—,
X is selected from oxygen and sulphur, with the proviso that $(R_1)_2N-$ and/or $(R_2)_2N-$ may signify the radical of a heterocyclic ring containing the nitrogen atom.

The term "lower" as used herein designates alkyl radicals of from 1 to 2 carbon atoms inclusive.

The Compounds I have a parasiticidal action.
The present invention also provides a process for the production of Compounds I, characterized in that a compound of Formula II

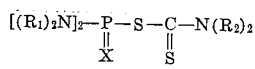    II in which $R_1$ and X have the above meaning, is reacted with a compound of Formula III

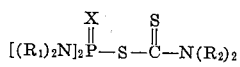    III in which $R_2$ has the above meaning,
Me is a salt forming cation, and
n is equal to the valency of the cation Me,
with the splitting off of Me (—halogen)$_n$ in which Me and n have the above meaning.

Examples of compounds of Formula II for use in the process of the invention are

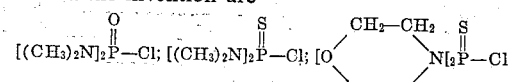

and

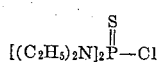

Examples of compounds of Formula III for use in the process of the invention are

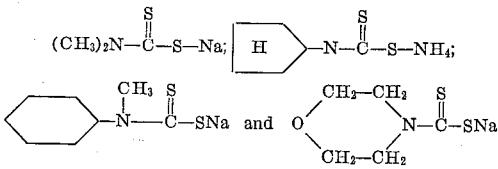

The process of the invention may, e.g., be effected as follows: A compound of Formula II and a compound of Formula III are heated in a suitable solvent, for example dimethylformamide, acetone or water, until the splitting off of Me (—halogen)$_n$, in which Me and n have the above meaning, according to the following equation is completed:

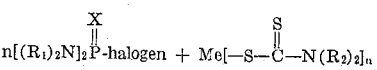

$$= n[(R_1)_2N]_2\underset{\underset{X}{\|}}{P}-S-\underset{\underset{S}{\|}}{C}N(R_2)_2 + Me(-halogen)_n$$

the symbols $R_1$, $R_2$, X, Me and n having the above meaning. The reaction, depending on the nature of the reactants, may be effected within the temperature range of 0–150° C.

At ordinary temperature most of the compounds of Formula I are crystalline products which may be kept in aqueous suspension and are soluble in oils as well as organic solvents. In general, compounds I have excellent systemic acaricidal and fungicidal properties; they are suitable for the production of parasiticidal compositions, especially fungicides (Examples $A_1$ and $A_2$ given below) and acaricides (Examples $B_1$ and $B_2$ given below).

Compositions of this kind may be produced, for example, from the active materials described in the following examples in such a way that the active substances are mixed with an emulsifier, for example an alkyl- or alkylphenylpolyglycolether and optionally with any desired organic solvent, for example an alcohol, ketone, mineral oil or aromatic hydrocarbon.

Likewise suitable are pulverulent compositions which may be produced in manner known per se by mixing the active agent with a suitable carrier material, for example celite, or dispersing agents, for example salts of dinaphthylmethane sulphonic acids, to which emulsifiers, wetting agents and adhesives may be added.

Suitable amounts of active ingredients in the above parasiticidal compositions are from about 0.01 to about 0.1%.

In the following examples, which illustrate the invention without limiting it, the temperatures are stated in degrees centigrade; Examples 1 to 9 show compounds of the invention, whereas Examples $A_1$, $A_2$, $B_1$ and $B_2$ illustrate their effect on parasites.

EXAMPLE 1

429 g. of the compound $(CH_3)_2N$—CSSNa are dissolved in 1 litre of dimethylformamide in a flask. 560 g. of a compound of formula

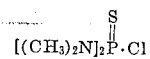

are added dropwise while stirring during about 30 minutes at 40°. After the dropwise addition is complete, stirring is continued for 1 hour at 50°, whereupon the content of the flask is poured into about 4 litres of water. The precipitated material is filtered with suction, dried and recrystallized from carbontetrachloride. An active material having parasiticidal properties of formula

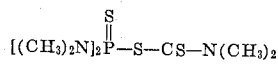

in the form of yellow crystals melting at 62° is obtained with a yield of about 70% of theory.

Calculated: P, 11.4%; N, 15.5%; S, 35.4%. Found: P, 11.1%; N, 15.3%; S, 35.2%.

In the following table, Examples 2 to 9 are listed; the method of producing each of the active materials is the same one which has been described in detail in Example 1.

| Ex. No. | Formula of active material | Melting points | P Calc. | P Found | N Calc. | N Found | S Calc. | S Found |
|---|---|---|---|---|---|---|---|---|
| 2 | $[(C_2H_5)_2N]_2P(S)-S-CS-N(CH_3)_2$ | 57-8° (from isopropanol) | 9.5 | 8.9 | | | 29.3 | 28.9 |
| 3 | $[(CH_3)_2N]_2P(S)-S-CS-N(C_2H_5)_2$ | Liquid $n_D^{20}$ 1.5973 | 10.3 | 8.5 | 14.0 | 14.1 | 32.1 | 31.3 |
| 4 | $[(CH_3)_2N]_2P(S)-S-CS-N\langle\rangle O$ | 82° (from CCl$_4$+petroleum ether) | 9.9 | 9.1 | 13.4 | 13.4 | 30.6 | 29.6 |
| 5 | $[(CH_3)_2N]_2P(S)-S-CS-N(CH_3)C_6H_5$ | 129.5° (from isopropanol) | 9.3 | 9.3 | | | | |
| 6 | $(O\langle\rangle N)_2P(S)-S-CS-N(CH_3)_2$ | 190° (from dioxan) | 8.7 | 8.6 | 11.9 | 11.8 | 27.0 | 27.0 |
| 7 | $(O\langle\rangle N)_2P(S)-S-CS-N(CH_3)C_6H_5$ | 163° (from ethanol) | 7.4 | 7.4 | | | | |
| 8 | $[(CH_3)_2N]_2P(O)-S-CS-N(CH_3)_2$ | 88-89° (from CCl$_4$+petroleum ether) | 12.1 | 12.0 | | | 25.0 | 23.3 |
| 9 | $[(C_2H_5)_2N]_2P(O)-S-CS-N(CH_3)_2$ | 79° (from isopropanol) | 9.9 | 9.3 | | | 20.5 | 20.1 |

The active materials mentioned in Examples 1 to 9 are dissolved, in manner known per se, in acetone with the addition of the required amount of emulsifiers from the series of alkylphenylpolyglycolethers, there being obtained preparations which are dispersible in water. These are used, in manner known per se, in the form of aqueous suspensions and are tested for their effectiveness as described in Examples A$_1$, A$_2$, B$_1$ and B$_2$.

EXAMPLE A$_1$

Using the active materials of each of Examples 1, 2 and 3 above, a number of suspensions in sets of three (each set consists of one suspension of each of the active materials) is made up so that the molar concentration of the three active materials is the same in each set but gradually increases from one set to the next. With each of these suspensions there is sprayed one object carrier each in such a way that on each carrier there is an equal amount of suspension. Thereafter the sprayed object carriers are dried and then on each of them there is placed 3 drops of an aqueous spore suspension of one species of fungus. The object carriers are then allowed to stand for 24 hours in a chamber at room temperature in a moist atmosphere, whereupon the percentage of the germinated spores is determined under a microscope (counting out of 200 spores per object carrier). In the following table there is stated at which minimum active material concentration the suspension has a 100% sporicidal effect.

| Fungus | Active material of Example 1 percent | Active material of Example 2 percent | Active material of Example 3 percent |
|---|---|---|---|
| Alternaria circinnans | 0.01 | 0.03 | 0.03 |
| Alternaria oleracea | 0.01 | 0.01 | 0.1 |
| Stemphylium sarciniforme | 0.03 | 0.03 | |

EXAMPLE A$_2$

Celery seedlings are thoroughly sprayed with a suspension containing 0.03% of the active agent of Example 1. After an interval of 24 hours the plants are sprayed with an aqueous spore suspension of the fungus septoria apii and kept in a chamber with a humid atmosphere until the disease has broken out after 10 to 14 days.

20 days after inoculation with the fungus spores, it may be ascertained that untreated control samples contain 100% of infected leaves with heavy amounts of fungus, while the treated plants are free of any fungus.

EXAMPLE B$_1$

Bean leaves attacked by mites (*tetranychus telarius*, adults and larvae III) are cut in disks of 2 cm. diameter. These are dipped for 3 seconds in an aqueous suspension containing 0.05% of the active material of Example 1 and also, in a second test, of Example 2.

Subsequently the disks are put into Petri dishes of which the floor has been covered with 3 layers of well moistened filter paper. After 48 hours, counting out of dead and living mites is effected.

The results representing average numbers of 4 tests are listed in the following table, the figures given under the heading of mortality being the percentage of dead mites after the above test duration:

| Treatment with active material of Example | Mortality, Percent |
|---|---|
| 1 | 100 |
| 2 | 56 |

EXAMPLE B$_2$

Bean plants are sprayed with 100 cc. of an equeous suspension containing 0.05% of the active material of Example 1 in such a way that the leaves are not contacted with the suspension. After one day the leaves are infected with *Tetranychus telarius* mites. 5 days after infection the mites on the leaves are counted out over an area of 6 cm.$^2$. In comparison with untreated plants it is found that infection of the treated plants is about 50% less than that of untreated ones.

We claim:
1. A compound of formula

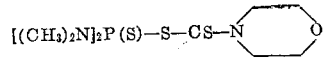

2. A compound of formula

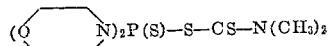

3. A compound of formula

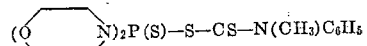

References Cited

UNITED STATES PATENTS

| | | | |
|---|---|---|---|
| 2,396,487 | 3/1946 | Blake | 260—455 |
| 3,098,001 | 7/1963 | Werres et al. | 167—30 |
| 3,234,305 | 2/1966 | Malz et al. | 260—545 X |
| 2,248,458 | 4/1966 | Oertel et al. | 260—935 |

ALBERT T. MEYERS, *Primary Examiner.*

V. C. CLARKE, *Assistant Examiner.*